INVENTORS
DENNISON BANCROFT
WILLIAM C. ELMORE
JAMES BYRON JONES
NICHOLAS MAROPIS
BY Arthur H. Seidel
ATTORNEY Jan. 26, 1965   D. BANCROFT ETAL   3,166,840
APPARATUS AND METHOD FOR INTRODUCING HIGH LEVELS
OF VIBRATORY ENERGY TO A WORK AREA
Filed June 28, 1961   3 Sheets-Sheet 2
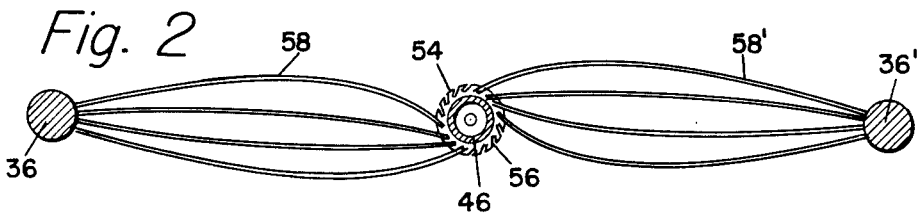
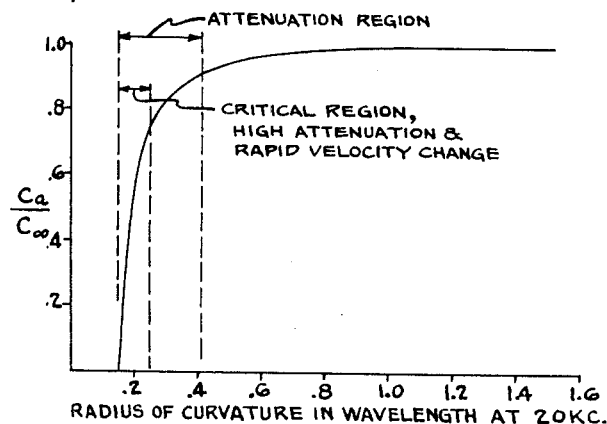
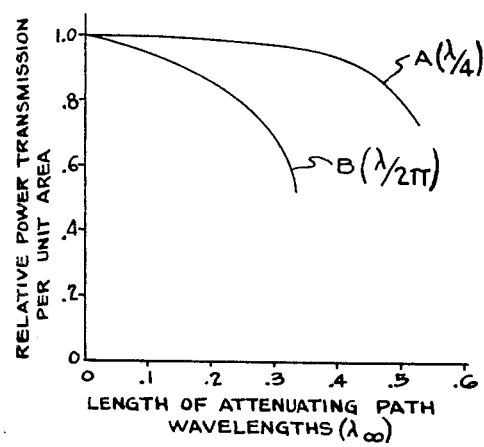
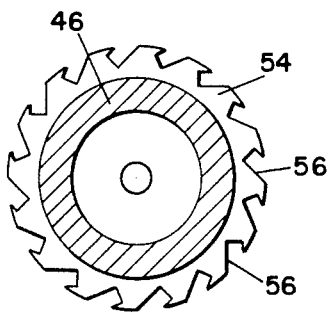
INVENTORS
DENNISON BANCROFT
WILLIAM C. ELMORE
JAMES BYRON JONES
NICHOLAS MAROPIS
BY *Arthur H. Seidel*
ATTORNEY

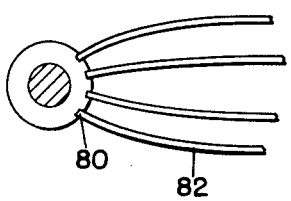
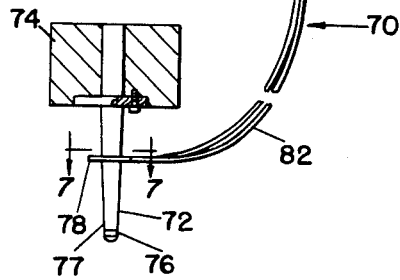
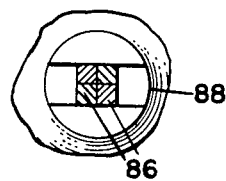
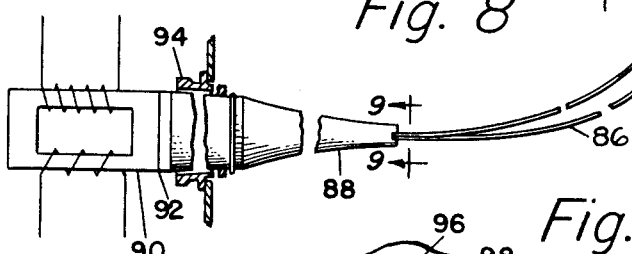
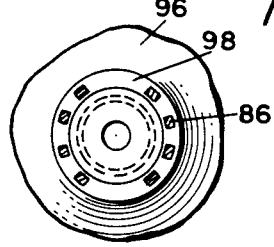

United States Patent Office 3,166,840
Patented Jan. 26, 1965

3,166,840
APPARATUS AND METHOD FOR INTRODUCING HIGH LEVELS OF VIBRATORY ENERGY TO A WORK AREA
Dennison Bancroft, Waterville, Maine, and William C. Elmore, Swarthmore, and James Byron Jones and Nicholas Maropis, West Chester, Pa., assignors to Aeroprojects Incorporated, West Chester, Pa., a corporation of Pennsylvania
Filed June 28, 1961, Ser. No. 120,233
22 Claims. (Cl. 29—470)

The present invention relates to apparatus for introducing high levels of vibratory energy to a work area, and more particularly to means useful in the vibratory welding of metals, the vibratory extrusion of metals and other materials, etc., wherein it is desirable or necessary to have apparatus capable of providing, handling, and transmitting high-power vibration.

Specifically, this invention relates to a transducer-coupling system wherein the vibratory power is delivered to a resonant element (which is usually a terminal element) by means of one or more long, slender, ribbon- or wire-type conductors of vibrations. Such resonant element is usually of markedly different cross-section from that of the wire-like members and may be designed to operate in a different mode of vibration than do the wire-like members.

In U.S. Patent application Serial No. 739,503, filed June 3, 1958, now U.S. Patent No. 3,039,333, entitled "Apparatus for Introducing High Levels of Vibratory Energy to a Work Area," in the names of James Byron Jones, Elmer E. Weismantel, and Carmine F. DePrisco, there is disclosed transducer-coupling systems comprising resonant terminal elements to which vibratory power is delivered by means of bulky sculptured members. Such apparatus is highly effective for the purposes indicated, but certain problems are encountered, as in joining problems associated with making metallurgical joints between the heavy members and the terminal resonant member. Problems also arise in attaching the heavy members to or through the associated parts, especially metal parts of a basic unit. Once these heavy members are attached, problems are encountered in avoiding interaction of the vibratory system with the associated parts of the unit.

Thus, as discussed in U.S. patent application Serial No. 739,504, filed June 3, 1958, now U.S. Patent No. 3,038,-359, entitled "Vibratory Device," in the names of James Byron Jones and Elmer E. Weismantel, extensive experience has shown that the joints between coupling members and power transmission members in a vibratory device, that is the transducer-coupling system, are subjected to high stresses and generally constitute the portion of such devices most prone to failure. It is to be noted that the coupling members discussed in the said application are also heavy sculptured members.

This is true also in a system such as that disclosed in U.S. patent application Serial No. 739,555, filed June 3, 1958, entitled "Method and Apparatus Employing Vibratory Energy for Bonding Metals and Metal Weldments Formed Thereby." In said last-mentioned application, there are disclosed systems involving torsional vibration, such as by torsional vibration of the transducer itself which then transmits torsional vibration to the coupling member or members; or, the terminal coupling members which is in contact with the work is otherwise made to vibrate torsionally as by appropriate design of that member or by joining the coupling member to other coupling members in such manner as to cause the terminal member to vibrate torsionally. It is in the last case that the joining problem is particularly acute, as when a plurality of non-terminal coupling members are used for providing high-power operation and each such member must be joined to the terminal coupling member. It will be appreciated that the joining problem is difficult, not only because of the number of joints involved but also because the non-terminal coupling members in this instance must be joined essentially tangentially to the terminal coupling member because of the principles of torsional vibration.

Very often, equipment of various kinds which is to be vibrated, such as ultrasonic extrusion equipment, requires heating elements with insulation to prevent or minimize heat loss, and other devices which are often capable of interaction with the vibratory parts of the system and which are often difficult of access when it is desirable or necessary to couple heavy vibration-transmitting members thereto.

Moreover, in connection with the vibration of cylindrical tubes having appreciable length, such as a length of from about six inches to twenty inches or more, where the tube or tubes are designed to be resonant at the design resonant frequency of the array of which they are a part (such as an array for ultrasonic cleaning, ultrasonic homogenization, etc.), it is difficult to maintain uniform tubular resonance (such as radial mode or other mode resonance) over the length of the tube. In fact, differential motions occur over the length of the tube, even in cases where a supposedly uniform drive is provided as by attaching a plurality of ceramic transducers along the length of the tube.

The present invention overcomes these and other problems, such as some impedance matching problems, by the non-terminal use of thin ribbons or wires for delivery of the vibratory energy to the terminal part of the system, thereby enabling maximum utilization of the vibratory energy to increase the usefulness of such vibratory systems in industrial applications.

It is an object of the present invention to provide a novel ultrasonic transducer-coupling system.

It is another object of the present invention to provide novel vibratory welding apparatus.

It is still another object of the present invention to provide novel vibratory extrusion apparatus.

It is yet another object of the present invention to provide novel vibratory welding apparatus utilizing torsional vibratory energy.

It is a further object of the present invention to provide a novel vibratory welding apparatus utilizing flexural vibratory energy.

It is a still further object of the present invention to provide a novel vibratory extrusion apparatus utilizing axial vibratory energy.

It is still another object of the present invention to provide a novel method of transmitting vibratory energy.

Other objects will appear hereinafter.

For the purpose of illustrating the invention there is shown in the drawings a form which is presently preferred, it being understood, however, that this invention is not limited to the precise arrangements and instrumentalities shown.

FIGURE 2 is a cross-sectional view taken along lines 2—2 in FIGURE 1.

FIGURE 3 is an enlarged view of the drive ring shown in FIGURE 2.

FIGURE 4 is a graph of the variation in sound velocity as a function of wire bend radius at 20 kc.

FIGURE 5 is a graph showing the relative mechanical power transmission per unit area as a function of the length of attenuating path and bend radius.

FIGURE 6 is a side elevation view of another apparatus of the present invention.

FIGURE 7 is a cross-sectional view taken along lines 7—7 in FIGURE 6.

FIGURE 8 is a side elevation view of still another apparatus of the present invention partly in section.

FIGURE 9 is a cross-sectional view taken along lines 9—9 in FIGURE 8.

FIGURE 10 is a cross-sectional view taken along lines 10—10 in FIGURE 8.

Referring to the drawings in detail, wherein like numerals indicate like elements, there is shown in FIGURE 1 a ribbon torsional welder designated generally as 10.

Figure 1:
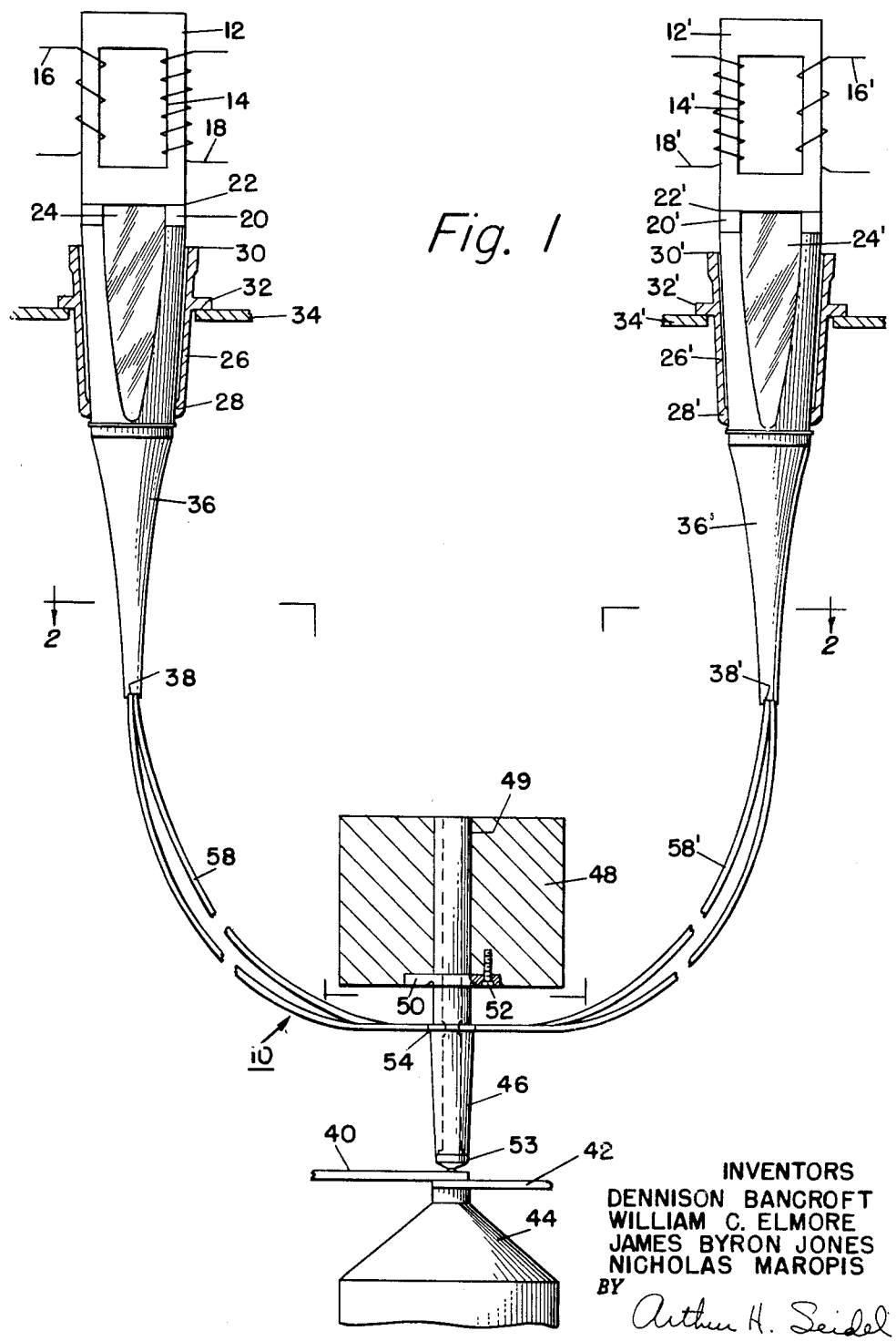
FIGURE 1 is a side elevation view of an apparatus of the present invention partly in section.

The ribbon torsional welder 10 comprises at least two vibratory generating means 12 and 12'. The vibratory generating means 12 and 12' are identical, therefore only the vibratory generating means 12 and its associated elements will be described in detail. The corresponding elements on the vibratory generating means 12' have the same numerals as the elements on the vibratory generating means 12 and are primed.

The vibratory generating means 12 may comprise a laminated core of nickel or other magnetostrictive metallic material. The vibratory generating means 12 is provided with a rectangularly shaped opening 14 in its center portion. A polarizing coil 16 and an excitation coil 18 are wound through the rectangularly shaped opening 14. Upon variations of the magnetic field strength of the excitation coil 18, there will be produced concomitant variations in the dimensions of the laminated core, provided the polarizing coil 16 is charged at a suitable level with D.C. current. It will be appreciated by those skilled in the art that the frequency of the aforesaid variations, namely the expansion and/or contraction of the laminated core will be equal to the frequency of the alternating current flowing in the excitation coil 18.

The vibratory generating means 12 and 12' are dimensioned to precisely identical dimensions so that the vibratory energy delivered therefrom is identical, for reasons of symmetry. The vibratory generating means 12 and 12' are driven in phase with one another, namely both laminated cores are either simultaneously expanding or simultaneously contracting.

In place of the laminated core in the vibratory generating means 12 and 12', other magnetostrictive materials may be used. For example, it is possible to use the alloy 2-V Permendur (an iron-cobalt alloy), a nickel-iron alloy, or Alfenol (an aluminum-iron alloy), each of which should be properly dimensioned to assure axial resonance with the frequency of the alternating current applied thereto so as to cause it to decrease or increase in length according to its coefficient of magnetostriction. In place of the aforesaid metallic magnetostrictive materials, the vibratory energy generating means 12 and 12' may comprise almost any material which has good physical properties and which changes its physical dimensions under the influence of electric potential or electric current. Thus, it may comprise a piezoelectric material, such as quartz crystals, or an electrostrictive material such as barium titanate, lead zirconate, etc. Such materials are presently used at high frequency operations, as at frequencies above 75,000 cycles per second, although they can be used at lower frequencies. A coupler 20, made from metal, is brazed or otherwise metallurgically secured in end-to-end engagement with the vibratory energy generating means 12 as shown at 22. The coupler 20 is provided with a milled flat portion 24 on opposite sides thereof. The coupler 20 preferably is one-half wavelength long longitudinally or may have a length equal to integral multiples of one-half wavelength.

A force-insensitive mount is provided for the coupler 20. The force-insensitive mount comprises a sleeve 26 which is described in U.S. Patents 2,891,178; 2,891,179; and 2,891,180. The disclosures in such patents are incorporated herein by reference. Such a support mount is particularly useful in applications requiring the use of force in conjunction with vibration. It is convenient to use in non-force applications also, although it may sometimes be dispensed with in such situations, according to the degree of control of vibration which is desirable or necessary. The sleeve 26 is made from a metal such as steel or any other suitable resonant material. The sleeve 26 has a length equal to a single one-half wavelength. The sleeve 26 surrounds the cylindrical coupler 20, is concentric therewith, and is spaced therefrom. One end of the sleeve 26 which is furthest from the vibratory generating means 12 is provided with a radially inwardly directed flange 28 which is metallurgically bonded to the coupler 20. The other end 30 of the sleeve 26 is free from any attachment, and accordingly when the vibratory energy generating means 12 is vibrating, a true node will develop in the sleeve 26 at the flange 32 which is one-quarter wavelength distant from the free end 30 of the sleeve 26. The sleeve 32 is adapted to be fixedly secured to the mount 34 and since said sleeve is disposed at a true node, no vibratory energy will be transmitted to the support mount 34.

The coupler 20 is provided with a tapered portion 36 dimensioned according to equations already known to the art. The free end of the tapered portion 36 is provided with a notch 38 extending from the free end toward the vibratory generating means 12.

The metal members 40 and 42 which are to be welded together in accordance with the process of the present invention are disposed in overlapping arrangement intermediate a torsionally rigid anvil 44 and the tip of a sonotrode 46. The sonotrode 46 comprises a cylindrical tube or rod which is supported by the mass 48. The engagement between the mass 48 and the sonotrode 46 occurs at a true node on the sonotrode 46, as at one-quarter wavelength in torsion or odd integral multiples of one-quarter wavelength in torsion from the free end of the sonotrode 46 which extends through a bore 49 in the mass 48. The flange 50, positioned at a true node, is disposed within a counterbore in the mass 48 and is fixedly secured to said mass 48 by a plurality of bolts 52. The flange 50 is an integral part of or is fixedly secured to the sonotrode 46 by brazing, welding, or the like.

The lowermost end of the sonotrode 46 is tapered so as to increase the amplitude of the vibratory energy at a replaceable tip 53 which is secured to the sonotrode 46. The lowermost face of the tip 53 engages the metal members 40 and 42 which are undergoing welding.

The sonotrode 46 is provided with an integral radially outwardly projecting flange 54 at the driving point which is at a position corresponding to a loop on said sonotrode 46. Thus, in the illustrated embodiment, the sonotrode 46 may have an overall length of one wavelength in torsion at the first overtone or second harmonic of its frequency of operation. The free end of the sonotrode 46 and the tip 53 are both approximately at loops on said sonotrode 46. The flange 54 is one-half wavelength from the free end and hence is also positioned at a loop, the first overtone or second harmonic having been chosen for convenience in connection with the positioning of the various elements of the system. However, as pointed out in the above-identified copending application, the sonotrode 46 may be constructed to operate in other modes of torsional vibration.

As seen more clearly in FIGURE 3, the flange or drive ring 54 is provided with a plurality of tangentially directed notches 56. Sixteen notches are shown, however it will be appreciated that the number of notches may be varied depending upon the requirements for a particular installation. A plurality of thin ribbons 58 extend between the notch 38 on the coupler 20 and the notches 56 on the drive ring 54.

All of the ribbons or wires may be of the same physical length, or they may be of different physical lengths; it is their acoustical length which is of importance. Thus, for providing maximum in-phase vibration of the wires relative to one another, so that maximum in-phase vibration is introduced to the resonant element to which they are attached, all of the ribbons must have an acoustical length of an even number of one-half wavelengths or of an odd number of one-half wavelengths; they need not be the identical even or odd number for each ribbon. This is because vibratory motion changes phase in alternate one-half wavelengths; for example, if at the end of one-half wavelength (said one-half wavelength comprising in succession a loop (antinode), a node, and a loop region respectively) at a given time the vibratory motion is extensive, then at the same moment the vibratory motion at the following corresponding one-half wavelength point will be compressive. As will be explained later, the acoustical length situation relative to out-of-phase vibration is somewhat different, though conforming to the same principle.

When the bend radius (radius of curvature) of the thin ribbons 58 is infinite, the maximum amount of the generated mechanical power will be delivered by the ribbons. Referring to FIGURE 4, it may be seen that substantially all of the generated mechanical power will be delivered by the thin ribbons 58 when the bend radius is equal to or greater than $\lambda/4$ wherein $\lambda$ is the wavelegnth of the vibratory power for the material of the ribbons. When the bend radius is $\lambda/2\pi$ and the bend angle is ninety degrees—e.g., the length of the attenuating path is $\lambda/4$ then only eighty percent of the mechanical power generated is delivered by the ribbons 58, as may be seen from FIGURE 5.

Referring to FIGURE 5, there is shown a graph which represents experimental data on the relative transmission of mechanical power delivered per unit area for two bend radii. The length of the attenuating path is the abscissa and the relative power transmission per unit area is the ordinate. Line A represents the relative power transmission per unit area where the bend radius is equal to $\lambda/4$. Line B is the relative mechanical power delivered per unit area where the bend radius is $\lambda/2\pi$.

As may be seen from FIGURE 4 and the theoretical analysis from which FIGURE 4 was derived, the minimum bend radius at which attenuation without phase change is obtained has a value of $\lambda/2\pi$.

The following implications must be considered when designing a transducer-coupling system incorporating thin ribbons such as shown by ribbons 58: The bend radius should be equal to or greater than $\lambda/4$ for maximum power transmission. Where possible, the length of the attenuating path must be less than $\lambda/4$.

The data illustrated by FIGURE 4 is independent of frequency. The experimental data of FIGURE 5 were obtained for a 20 kc. system, but there is no reason to suppose that greatly different results would be obtained at a different frequency.

The change in power transmission due to change in bend angle is due to the fact that, for any given radius of curvature (or bend radius), as the bend angle is increased the length of the arc of the bend is increased; i.e., the length of the attenuating section is increased, causing a decrease in power transmission as evidenced by the experimentally obtained curves of FIGURE 5.

The following is a discussion of the theoretical background for the above statements, concerning transmission of vibrations along a bent rod. This treatment is based on results in A. E. H. Love, A Treatise on the Mathematical Theory of Elasticity, Dover Publications, 1944, page 453. Love shows that the following equations apply for a vibrating rod of circular cross-section, radius $r$, which forms a circle of mean radius $a$, where the displacement $u$ is directed along the radius drawn towards the center of the latter circle and displacement $w$ is perpendicular to the radius of the circle:

$$ma\frac{\partial^2 u}{\partial t^2} = \frac{E\pi r^2}{a}\left(\frac{\partial w}{\partial \theta} - u\right)$$

$$ma\frac{\partial^2 w}{\partial t^2} = \frac{E\pi r^2}{a}\left(\frac{\partial^2 w}{\partial \theta^2} - \frac{\partial u}{\partial \theta}\right) \quad (1)$$

where $m = \rho\pi r^2$ and is the mass per unit length of rod, $\theta$ = the angular position, $E$ = Young's modulus of elasticity, and $t$ = time.

Replacing functions of $\theta$ by functions of $Z = a\theta$ and $m$ by its equal $\rho\pi r^2$, and substituting the customary $c$ for the bar velocity $$\sqrt{\frac{E}{\rho}}$$

Equations 1 then become $$c^2\left(\frac{1}{a}\frac{\partial w}{\partial Z} - \frac{u}{a^2}\right) = \frac{\partial^2 u}{\partial t^2} \quad (2)$$

$$c^2\left(\frac{\partial^2 w}{\partial Z^2} - \frac{1}{a}\frac{\partial u}{\partial Z}\right) = \frac{\partial^2 w}{\partial t^2} \quad (3)$$

We are concerned with sinusoidal vibrations of angular frequency $w$, and so replace ($\partial^2 w/\partial t^2$) by $-w^2$ in both equations, and then eliminate $u$ in Equation 3 by substitution from Equation 2 to obtain $$\frac{d^2 w}{dZ^2} + \frac{w^2}{c^2}\left(1 - \frac{c^2}{w^2 a^2}\right)w = 0 \quad (4)$$

This is a wave equation in standard form, the solution of which shows that the angular wave number $K_a$ for the rod bent in a circle of radius $a$ has the value:

$$K_a = \frac{K\infty}{\sqrt{1 = K\infty^2 a^2}} \quad (5)$$

where $$K\infty = \frac{2\pi}{\lambda\infty} = \frac{w}{c}$$

pertains to a straight rod ($a = \infty$).

This result has two implications:

(A) A minimum radius of curvature (bend angle)

$$a_{\min} = \frac{1}{K\infty} = \frac{\lambda\infty}{2\pi} \quad (6)$$

exists where $\lambda\infty$ is the wavelength for a straight rod. Waves will not be transmitted without phase change if the rod is bent into a tighter arc.

(B) The speed of waves on the bent rod is smaller, being given by $$c_a = \frac{w}{K_a} = c\sqrt{1 - \frac{1}{K\infty^2 a^2}} \quad (7)$$

This decrease in speed must be taken into account if, for example, the bent rod is to have a specified number of one-half wavelengths for its total length. If the radius $a$ varies along the rod, it should be sufficiently accurate to compute an average speed by averaging Equation 7 over the rod. The bent rod will always be shorter than the straight rod. If the curved rod does not lie in a plane, the local radius $a$ may be taken as that of the principal radius of curvature, although this procedure probably results in some inaccuracy.

In operation, the vibratory energy generating means 12 and 12' are operated in phase with one another and the generated vibratory energy is transmitted by the couplers 20 and 20' through the thin flexible ribbons 58 and 58' to torsionally vibrate the sonotrode 46. Since the flexible ribbons 58 and 58' are disposed within the tangential notches 56, the sonotrode 46 is caused to oscillate peripherally. The oscillating peripheral or circumferential motion of the tip 53 during the torsional vibration of the sonotrode 46 is in phase with the oscillating peripheral or circumferential motion of the free end of the sonotrode 46, but is 180 degrees out of phase with the motion of the drive ring 54 which is metallurgically joined to the thin flexible ribbons 58 and 58' when the first overtone or second harmonic of torsional vibration construction is used.

When the face of the tip 53 which is juxtaposed to the uppermost surface of the metal member 40 vibrates, it vibrates in a ring direction which is essentially in the plane of the interface between the metal members 40 and 42. This effects the vibratory welding between the metal members 40 and 42 in the region in which the same are engaged with the tip 53.

While only eight ribbons are shown in FIGURE 2 of the drawing, it will be appreciated by those skilled in the art that more or fewer ribbons may be provided. The number will generally depend upon the power requirements and the degree of acoustic impedance match desired between the end of the wires or ribbons and the resonant element to which they are to be attached. If the same materials are used as for the purpose of enabling even power transmission, this matching problem is often principally a matter of matching areas. Then, the areas should be matched so that $A\sigma c = A'\sigma c$; wherein A is the area of the surface on the resonant member to which the ribbons will be attached, A' is the area of the end faces of the ribbons, $\sigma$ is the density of the material, and $c$ is the velocity of sound in the material. However, different materials may be used for the ribbons, so long as the wavelength dimensioning is observed, with due regard for the different densities, sound velocities, and areas for impedance matching purposes. Of course, other impedance matching factors may be involved, as will be appreciated by those skilled in the art, especially if the resonant element is to vibrate in a mode different from the mode of vibration of the ribbons or wires.

For example, in effecting an impedance match between the longitudinal vibratory motion of the thin wires and the torsional vibratory motion of the resonant element of FIGURES 1 and 2, a rather complex impedance matching problem is encountered, by virtue of the mass of the flange and the resulting non-uniform mass distribution, thereby providing a condition yielding an impedance at the flange position not governed by the area alone but governed rather by the rotational moment of inertia of the flange at that point.

It should be noted also that the distance from flange 50 to flange 54 is not one-quarter wavelength in the torsional member, but an effective one-quarter wavelength; i.e., it is less than a physical one-quarter wavelength. Thus, the stiffness reactance supplied by this section equals the mass reactance supplied by the vibratory motion of the mass of the coupling flange, and together they comprise one-quarter wavelength. The distance from the flange 54 to the tip 53, then, is an equivalent one-half wavelength and differs from the thin rod torsional wavelength by the amount of taper associated with this rod.

Of course, the above are practical matters involved in attempting to achieve optimum conditions and are more concerned with implementing the present invention rather than with the invention itself, involving as they do, matters within the skill of the ultrasonic art, but they are given here as a matter of clarity.

Each of the ribbons are preferably made from a thin flexible material such as Monel, and may have, for example, cross-sectional dimensions approximately .060 inch by .130 inch. The ends of the ribbons 58 are metallurgically bonded within the notch 38 on the coupler 20 and within the notches 56 on the drive ring 54. Since all of the thin ribbons 58 emanate from the notch 38 and extend to notches spaced around the periphery of the drive ring 54, the thin ribbons 58 are not identical in length. Successful tests have been performed with ribbons having a length of up to sixty inches.

Vibratory welding processes and apparatus employing torsional vibratory energy have been described in U.S. patent application Serial No. 739,555, filed June 3, 1958, entitled "Method and Apparatus Employing Vibratory Energy for Bonding Metals and Metal Weldments Formed Thereby," in the names of James Byron Jones and Carmine F. DePrisco. The disclosure in said patent application is incorporated into the subject patent application and made a part hereof. Welding in accordance with the present invention employing torsional vibratory energy may be effected under the conditions heretofore generally developed and set forth in the above-identified patent application. The tip 53 on the sonotrode 46 may be of the type shown in the above-identified copending application wherein the tip produces an annular ring-like weld.

An alternative embodiment of the present invention designated as 70 is shown in FIGURES 6 and 7 wherein the terminal member is driven in flexure. A sonotrode 72 is urged downwardly by means of a massive support 74. A removable tip 76 is secured to one end of the sonotrode 72 below the tapered portion 77. The tip 76 and the other end of the sonotrode 72 are both approximately at loops on the sonotrode 72, such as may be provided for by designing sonotrode 72 to operate at the third or fourth overtone.

The sonotrode 72 is provided with an integral radially outwardly projecting flange 78 which is at a position corresponding to a loop on said sonotrode 72. The flange 78 is provided with a plurality of radially extending slots 80. Each slot 80 receives and is metallurgically bonded to one end of a ribbon 82. The other end of each ribbon 82 is metallurgically bonded to a coupler 84. Coupler 84 is connected to a means for generating vibratory energy which is identical with the corresponding structure in FIGURE 1 and therefore need not be described in detail. While the ribbons 82 are secured within slots 80 on the flange 78, it will be appreciated that a direct connection between the end of the ribbons 82 and the peripheral surface of the flange 78 may be provided.

The tapered portion 77 on the sonotrode 72 between the flange 78 and the tip 76 increases the amplitude of the vibratory energy. This reduces the stress at the juncture of the ribbons 82 and the flange 78 by permitting a reduced drive amplitude while obtaining a desirable high amplitude of vibratory energy at the tip 76. It will be noted that the sonotrode 46 may be likewise tapered.

Vibratory welding processes and apparatus employing flexural vibratory energy have been described in U.S. Patent No. 2,946,119, issued July 26, 1960, entitled "Method And Apparatus Employing Vibratory Energy For Bonding Metals," in the names of James Byron Jones, William C. Elmore, and Carmine F. DePrisco. The disclosure in said patent is incorporated into the subject patent application and made a part hereof. Welding in accordance with the present invention employing flexural vibratory energy may be effected under the conditions heretofore generally developed and set forth in the above-identified patent.

Welding in accordance with U.S. Patent No. 2,946,119 and U.S. patent application Serial No. 739,555, mentioned above, is effected under a clamping force sufficient to hold the metal members being welded in intimate contact at the intended weld interface. The clamping force may be varied over a broad range. Thus, in a preferred embodiment, the maximum clamping forces need not produce an external deformation of more than about ten percent in weldments effected at room or ambient temperatures. By deformation is meant the change in dimensions of the weldment adjacent the weld zone divided by the aggregate thickness of the weldment members prior to welding, the result multiplied by 100 to obtain percentage. In many cases the extent of deformation is appreciably below ten percent and in some instances may be virtually absent altogether. The minimal clamping force to be used in the process of the present invention comprises a force sufficient to maintain the metal members being welded in regulated alignment in intimate contact at the intended weld interface.

The range of operative clamping pressures which may be employed may be readily ascertained by the user of the process. In all cases the clamping force must be sufficient to effect coupling between the metal members being welded and the source of vibratory energy, so that the vibratory energy may be transmitted to the metal members.

The operative range of vibratory welding frequencies may include frequencies within the range 59 to 300,000 cycles per second. The preferred range is about 400 to 90,000 cycles per second, and the optimum operating frequency range lies between 5000 and 75,000 cycles per second. This optimum range of operating frequencies may be readily achieved by transducer elements of known design, which are capable of generating elastic vibratory energy of high intensity.

Welding may be and in many instances is initiated at room temperatures or ambient temperatures without the application of heat. The weldment may be warm to the touch after the weld due to the application of the elastic vibratory energy. If desired, welding may be initiated at elevated temperatures below the fusion temperature (melting point or solidus temperature of any of the pieces being joined). The temperature to which the foregoing statements refer is that temperature which can be measured by burying diminutive thermocouples in the weld zone prior to welding, as well as the temperature which can be estimated, approximated, or inferred from a metallographic examination of a cross-section of a vibratory weld in the ordinary magnification range up to about 500 diameters.

Heating the metals to be welded prior to, and/or during welding to a temperature below their fusion temperature may, in some cases, facilitate the ease of welding and lower the power requirements and/or time requisite to achieve welding. The instant invention comprehends the welding of metal members in ambient atmosphere as well as welding under vacuum conditions or in selected conditions such as atmospheres comprising an inert gas.

The welding process of the present invention may be applied to a variety of metals and alloys, examples of which include: aluminum to aluminum; aluminum alloy to aluminum alloy; nickel-plated low-carbon steel to gold-plated iron-nickel-cobalt alloy; copper to copper; aluminum alloy to iron-cobalt-vanadium alloy; etc. The present invention may be employed to effect a weldment without extensive precleaning. However, a certain amount of precleaning and surface treatment may prove advantageous in the welding of many metals. It is desirable prior to effecting welding in accordance with the present invention to remove surface contaminants, such as hydrocarbons and other lubricants and the like.

Vibratory extrusion processes and apparatus have been described in copending U.S. patent application Serial No. 628,126, filed December 13, 1956, now U.S. Patent No. 3,002,614, entitled "Vibratory Squeeze-Forming Of Metals in the Solid State and Apparatus Therefor," in the name of James Byron Jones. The disclosure in said patent application is incorporated into the subject patent application and made a part hereof. Vibratory extrusion in accordance with the present invention employing especially axial vibratory energy, as described below and shown in FIGURES 8–10, may be effected under the conditions heretofore generally developed and set forth in the above-identified patent application.

As illustrated in FIGURES 8–10, wires or ribbons 86 are axially attached to a coupling member 88 which is axially secured to a vibration generating means of the type discussed above and shown in FIGURES 1 and 6. The wires 86 could be attached directly to the face of the transducer 90 at 92 and thereby be excited at exactly the same amplitude as the end of the transducer stack if the entire face of the stack is uniformly covered with ribbons, but this is not preferred as it is rather impractical. The coupling system in FIGURE 8 has a support mount 94 which has advantages associated with very low losses to the support itself. When installed in a support-mounted coupling system as shown, it is apparent that the transducer 90 can be contained in a cooling vessel containing fluids and that the performance of the transducer 90 can be stabilized temperature-wise and operated at a higher output accordingly.

The ends of the ribbons or wires 86 are axially metallurgically bonded to one end 98 of a resonant mount 96 having a radially inwardly directed flange 100. Flange 100 is positioned one-quarter wavelength or odd unit multiples thereof from the free end 102 of the mount 96. The innermost peripheral surface of the flange 100 is counterbored and threadingly engaged with the outer peripheral surface of a hollow cylinder 104. Thus, a shoulder 106 is provided on the flange 100 for engagement with a shoulder on an end of the cylinder 104. A rod actuated ram 108 is slidably disposed within the cylinder 104.

The lower end of the cylinder 104 is in communication with the bore of a die 110 by way of a chamber 112 in the mount 96. The die 110 is threadably secured to the end 98 of the mount 96 radially inwardly from the securement between the mount 96 and the wires or ribbons 86 as shown more clearly in FIGURE 9. The flange 100 is at a node on mount 96. Hence, there is no "leakage" of vibratory energy to the cylinder 104.

FIGURE 4 illustrates the change in sound velocity at a frequency of 20 kc. as a function of bend radius, showing the region where attenuation begins and the region of very high attenuation. From FIGURE 4 it may be seen that, if the bend radius is maintained gerater than about 3/10-wavelength, attenuation will be relatively small and almost any bend angle may be used—in fact the ribbons may be spiraled.

It is to be emphasized that the wire- or ribbon-drive system used as an intermediate link between one or more transducers and a resonant element provides great flexibility unavailable from other coupling drive systems. For example, in the extrusion array illustrated in FIGURE 8, the wires or ribbons 86 are conveniently splayed away from the extrusion die orifice so as to provide little interference with observations of the extrusion as it issues from the orifice, and also so as to permit the removal and replacement of die 110. Older ultrasonic extrusion system devices, for example, were rigid sculptured metal objects essentially locating the extrusion orifice at the end of a tunnel, which interfered with observation of the issuing extrusion, the replacement of orifice or die plates, etc. Moreover, with the transducer 90 remotely located from the extrusion apparatus, thermal isolation of the transducer 90 is accomplished and this is very important, particularly when the extrusion of hot materials, especially hot metals, is being effected. The efficiency of vibratory energy transmission along a metallic conductor is associated with the temperature of the conductor. Thus, it is easy to cool a wire or ribbon and avoid long acoustical "runs" with hot coupler elements, whereas it is difficult to cool heavy metal cross-sections to the end that the over-all problem becomes considerably aggravated.

In the instances where the wire- or ribbon-drive produces a mode of vibration other than the axial (see FIGURE 1), such as when driving the torsional element of a torsional welder, or when driving a resonant terminal element in flexure (see FIGURE 6), compromises often have to be made in the location of the wires or ribbons on the resonant element; e.g., they may be located at other than optimum positions. Under some circumstances, most easily understood in the case of the torsional element, it is not uncommon to find reflected waves in the wires or ribbons in a different mode of vibration than the mode utilized to transmit the energy into the resonant element in the first place. For example, the operation of the torsional element introduces flexural waves in the wires progressing back to the source of the power. In the case of the reed welding array illustrated in FIGURE 6, when the wires are not located with complete perfection, there is also a flexural wave projected back along the wires.

These reflected flexural waves, if not anticipated and provided for, can produce fracture of the junctions at the ends of the ribbons or wires or actual breakage in middle portions of the wires or ribbons due to extreme stresses associated with the flexural waves and the initially-propagated compression waves. These reflected waves can be eliminated as a source of trouble by altering the mass distribution of the system, as by strategic location of small masses along the ribbons or wires, or, for example, by "softening" the wire or ribbon in flexure adjacent the point where it contacts the resonant terminal element, as, for example, by flattening a round wire element or thinning a ribbon element, so that, in effect, the flexural waves reflected backwards from the resonant terminal element encounter additional mass and/or additional stiffness.

It will be understood that the bend radius limitations of the ribbons 58 also applies to ribbons 82 and 86. It should be obvious that the wires or ribbons in FIGURES 1–10 are not of equal length. For example, the outermost wires or ribbons 82 in FIGURE 7 are slightly longer than the innermost wires or ribbons 82, but this is compensated for by the bend radius, which is adjusted so that each ribbon is exactly $n\lambda/2$ where $n$ is an integer. However, for optimum operation, the length of each ribbon must be an integral number of one-half wavelengths in the material at the system frequency, so that a loop is obtained at both ends of the ribbons. The wires or ribbons in FIGURES 1–10 need not be of any particular cross-section. They may be round, rectangular, square, etc. Moreover, they need not be of uniform cross-section. If the cross-section is varied, or the ribbons are bent, proper length adjustments must be made to accommodate the concomitant change in sound velocity in order to maintain resonance. Thus, if a ten percent change in sound velocity is computed from the equations of page 12, then the correction is made by reducing the length of that portion of the coupler by ten percent. For heavy duty equipment, the ribbons may be two inches wide and 3/8 inch thick, for example.

It is to be noted that the ribbons may be operated to vibrate in phase with one another or out of phase, such as 180 degrees out of phase, according to the effect desired. Out-of-phase operation can be achieved by length variation of the ribbons or by other known means. Thus, in connection with such length variation for out-of-phase operation, some of the ribbons may each have a length of an even number of one-half wavelengths while the others may each have a length of an odd number of one-half wavelengths. Preferably, the number of ribbons in the two groups should be equal.

In FIGURES 1–3 the axial vibratory energy of the wires or ribbons is changed to torsional vibratory energy in a terminal member. In FIGURES 6 and 7, the axial vibratory energy of the wires or ribbons is changed to flexural vibratory energy in a terminal member. In FIGURES 8–10, the axial vibratory energy of the wires or ribbons is transmitted axially to a terminal member. In each embodiment, it is the terminal member which performs useful work.

Hereinafter, the sonotrodes 46 and 72 may be referred to as a force-applying jaw. The tip 53 of the sonotrode 46 and the tip 76 of the sonotrode 72 may be referred to as an end portion which is impelled against one of the metal members to-be-welded.

The present invention may be embodied in other specific forms without departing from the spirit of essential attributes thereof and, accordingly, reference should be made to the appended claims, rather than to the foregoing specification as indicating the scope of the invention.

It is claimed:

1. A non-fusion method for welding metal members together which comprises placing to-be-welded faces of the metal members together, applying a force through a pair of jaws to the metal members in a direction and of a magnitude to hold the contacting to-be-welded faces of the metal members in intimate contact at the intended weld zone and to couple mechanical vibratory energy into said zone, using a plurality of flexible ribbons to transmit energy to vibrate at least one of said jaws, and introducing a mechanical vibration having a frequency of between 59 and 300,000 cycles per second from said one jaw to the metal members, with the vibratory energy introduced to said metal members from said one jaw being at a sufficient energy level to weld the metal members together.

2. A method in accordance with claim 1 including vibrating said ribbons in an axial mode of vibration, and said step of using a plurality of flexible ribbons to transmit energy to vibrate at least one of said jaws including vibrating said one jaw in a mode of vibration which differs from the mode of vibration of said ribbons.

3. A method in accordance with claim 2 including the step of extending said ribbons from spaced points on said one jaw through an angle from 0 to 90 degrees with respect to the longitudinal axis of said one jaw, with the bend radius of said flexible ribbons being greater than $\lambda/4$, wherein $\lambda$ is the wavelength of the material of said ribbons.

4. In an apparatus comprising means for generating vibratory energy, an acoustically resonant terminal member adapted to perform useful work, at least two flexible resonant ribbons having antinodes at their ends, one end of each ribbon being axially coupled to said means so that said ribbons vibrate in a longitudinal mode of vibration, means connecting the other end of each ribbon to said member at spaced antinode regions on said member, whereby high levels of vibratory energy may be transmitted from said means through said ribbons to said member.

5. In an apparatus in accordance with claim 4 including means for preventing energy transmitted to said member from being reflected into said ribbons.

6. In an apparatus in accordance with claim 4 wherein the longitudinal axis of said member is disposed at an angle from 0 to 90 degrees with respect to the longitudinal axis of said vibration-generating means, and said ribbons extending from spaced points on said member with the bend radius of said ribbons being at least equal to $\lambda/4$, wherein $\lambda$ is the wavelength of the material of said ribbons.

7. In an apparatus in accordance with claim 6 wherein said resonant member comprises a hollow shell having a radially inwardly directed flange on its inner periphery, said ribbons being connected to an end surface of said shell, a die secured to said end of said shell radially inwardly from the point of securement of said ribbons to said shell, a cylinder secured to said radially inwardly directed flange on said shell, and said cylinder being in communication with said die by a chamber within said shell.

8. In an apparatus in accordance with claim 6 wherein said resonant member comprises a sonotrode, a radially outwardly directed flange at a node on said sonotrode, and said ribbons being connected to said flange with the end of said ribbons being disposed within a slot on said flange.

9. Apparatus in accordance with claim 8 wherein said slots on said flange extend from the periphery of said flange in a radial direction.

10. Apparatus in accordance with claim 8 wherein said slots on said flange are tangentially disposed with respect to the periphery of said flange.

11. Apparatus for non-fusion welding contacting metal members together comprising a force-applying jaw, means for impelling an end portion of said force-applying jaw against an outer face of one of said contacting metal members with a force in a direction and of a magnitude to hold to-be-welded faces of the metal members in intimate contact at the intended weld zone, a vibration means including flexible ribbons, said ribbons having one end connected to said force-applying jaw, said vibration means vibrating said force-applying jaw at a frequency of between 59 and 300,000 cycles per second, with said vibration means furnishing sufficient power so that the mechanical vibration delivered by said end portion is at a sufficient energy level to weld the metal members together.

12. Apparatus in accordance with claim 11 wherein said one end of said flexible ribbons are metallurgically joined to said force-applying jaw at circumferentially spaced points on the periphery of said force-applying jaw.

13. Apparatus in accordance with claim 12 wherein the longitudinal axis of said vibration means is disposed at an angle from 0 to 90 degrees with respect to the longitudinal axis of said force-applying jaw, and the bend radius of said flexible ribbons being at least $\lambda/4$, wherein $\lambda$ is the wavelength of sound in the material of the ribbons at the operating frequency.

14. Apparatus in accordance with claim 11 wherein said vibration means includes a coupler, and the other ends of said ribbons being secured to said coupler within a notch on said coupler.

15. Apparatus for non-fusion welding contacting metal members together comprising a force-applying jaw, means for impelling an end portion of said force-applying jaw against an outer face of one of said contacting metal members with a force in a direction and of a magnitude to hold the to-be-welded faces of the metal members in intimate contact at the intended weld zone, and a pair of vibration means including flexible ribbons each having one end connected to said force-applying jaw for torsionally vibrating said jaw at a frequency of between 59 and 300,000 cycles per second, said pair of vibration means being in phase with one another, said pair of vibration means furnishing sufficient power so that the mechanical vibration delivered by said end portion is at a sufficient energy level to weld the metal members together.

16. Apparatus for non-fusion welding contacting metal members together comprising a force-applying jaw, means for impelling an end portion of said force-applying jaw against an outer face of one of said contacting metal members with a force in a direction and of a magnitude to hold the to-be-welded faces of the metal members in intimate contact at the intended weld zone, a vibration means having flexible ribbons, one end of each of said ribbons being connected to said jaw at circumferentially spaced points so as to drive said jaw in a flexural mode of vibration at a frequency of between 59 and 300,000 cycles per second, with said vibration means furnishing sufficient power so that the mechanical vibration delivered by said end portion is at a sufficient energy level to weld the metal members together.

17. A method of providing maximum transfer of high levels of vibratory energy through an angle without attenuation comprising the steps of providing a vibration-generating means and a resonant work performing element so that their longitudinal axes are not aligned, providing at least two resonant flexible members having antinode regions at their ends which ends are coupled to one of said means and element with a good impedance match therebetween, providing at least a portion of said members extended through an arcuate path so that the bend radius of each portion is at least equal to $\lambda/4$ wherein $\lambda$ is the wavelength of sound in the material of said members at the operating frequency, and using said flexible members to transmit vibratory energy from said means to said element.

18. A method in accordance with claim 17 including torsionally vibrating said element about its longitudinal axis by the energy transmitted thereto from said members.

19. A method in accordance with claim 17 wherein said impedance match is attained by matching the area of the other end of said members to the juxtaposed area of said element.

20. A method in accordance with claim 17 including preventing the transmission of reflected waves in said members from said element.

21. A method in accordance with claim 17 including using said members to transmit vibratory energy in phase with each other.

22. A method in accordance with claim 17 including using said members to transmit vibratory energy out-of-phase with each other.

References Cited by the Examiner
UNITED STATES PATENTS

| | | | |
|---|---|---|---|
| 2,985,954 | 5/61 | Jones et al. | 29—470 |
| 3,002,614 | 10/61 | Jones | 207—2 |
| 3,029,766 | 4/62 | Jones | 310—26 XR |

JOHN F. CAMPBELL, *Primary Examiner.*